US012457993B2

(12) United States Patent
Hoffman et al.

(10) Patent No.: US 12,457,993 B2
(45) Date of Patent: Nov. 4, 2025

(54) AGILITY HOOP

(71) Applicant: Hoffco International Imports, LLC, Lititz, PA (US)

(72) Inventors: Stacey Ann Hoffman, Lititz, PA (US); Andrew Ryan Hoffman, Lititz, PA (US)

(*) Notice: Subject to any disclaimer, the term of this patent is extended or adjusted under 35 U.S.C. 154(b) by 0 days.

(21) Appl. No.: 18/581,612

(22) Filed: Feb. 20, 2024

(65) Prior Publication Data

US 2025/0261614 A1    Aug. 21, 2025

(51) Int. Cl.
*A01K 15/02*    (2006.01)

(52) U.S. Cl.
CPC .................................. *A01K 15/027* (2013.01)

(58) Field of Classification Search
CPC ................................ A01K 15/02; A01K 15/027
See application file for complete search history.

(56) References Cited

U.S. PATENT DOCUMENTS

| 6,533,635 | B1 * | 3/2003 | Chern | A63B 19/02 |
| | | | | 446/236 |
| 8,172,636 | B1 * | 5/2012 | Carbonero | A63B 19/04 |
| | | | | 446/120 |
| D867,457 | S * | 11/2019 | Sweeney | D21/302 |
| D995,007 | S * | 8/2023 | Hu | D30/160 |
| D1,039,299 | S * | 8/2024 | Tan | D6/677.5 |
| 2008/0234108 | A1* | 9/2008 | Males | A63K 1/02 |
| | | | | 482/16 |
| 2010/0077966 | A1* | 4/2010 | Horrocks | A63K 3/046 |
| | | | | 119/705 |
| 2015/0114308 | A1* | 4/2015 | Dolphin | A63K 3/04 |
| | | | | 119/705 |
| 2020/0122051 | A1* | 4/2020 | Covalschi | A63B 69/0028 |

FOREIGN PATENT DOCUMENTS

| CA | 2414827 C | * | 5/2006 | ........... A01K 15/027 |
| DE | 20109500 U1 | * | 4/2002 | ............. A01K 15/02 |
| DE | 202005013512 U1 | * | 1/2006 | ........... A01K 15/027 |
| DE | 202017104556 U1 | * | 11/2017 | |

(Continued)

OTHER PUBLICATIONS

Affordable Agility, "Agility in The Bag". Amazon, Nov. 17, 2009, https://www.amazon.com/Affordable-Agility-Bag/dp/B002XEOHPY#averageCustomerReviewsAnchor. (Year: 2009).*

(Continued)

*Primary Examiner* — Jack W Keith
*Assistant Examiner* — Hae Rie Jessica Byun
(74) *Attorney, Agent, or Firm* — Saxton & Stump. LLC

(57) ABSTRACT

A breakaway hoop is disclosed. The hoop has a top portion connected to two bottom portions by a hinged joint. The two bottom portions are connected at the nadir of the hoop in such a way that a force directed at the bottom portions can cause this connection to separate, allowing the paired bottom portions to rotate apart from each other. The disclosed hoop is useful as a dog agility course obstacle as the breakaway function lessens the risk of injury to a dog if the dog contacts the bottom of the hoop during a jump. Further, the breakaway feature indicates if a threshold of contact by the dog is reached, allowing a new and easily scored metric to be added to the results of an agility competition.

1 Claim, 5 Drawing Sheets

(56) References Cited

FOREIGN PATENT DOCUMENTS

DE    102023123587 A1 *  3/2025
JP       2001079110 A  *  3/2001   ............... A61H 7/00

OTHER PUBLICATIONS

Koto and Niah the Border Collie. "Galican Soft Breakaway Dog Agility Tyre for Australia." YouTube, uploaded by Koto and Niah the Border Collie, Sep. 11, 2017, https://www.youtube.com/watch?v=1eqBaesbgag. Screenshots at 0:05, 0:10, 0:14, 0:18, 0:21, 0:31, 0:33, 0:34 minutes. (Year: 2017).*
Jaycee Jumps. "The New Jaycee Jumps Ultimate safety tyre just been approved by the KC." Facebook, May 22, 2018, https://www.facebook.com/share/p/1AMvDECdvm/, p. 6. (Year: 2018).*
Jaycee Jumps. "Breakaway Ultimate Tyre (Bottom Drop, Top Open)." JayceeJumps, 2025, https://www.jayceejumps.co.uk/product/breakaway-ultimate-tyre-bottom-drop-top-open/, pp. 1-5. (Year: 2025).*

\* cited by examiner

AGILITY HOOP

FIELD OF THE INVENTION

The present disclosure is generally directed to obstacles used in obstacle courses and for agility training. More specifically, the subject matter of this application pertains to devices used to exercise dogs and to train them to run obstacle courses.

BACKGROUND OF THE INVENTION

Dog agility has evolved from a niche sport to a mainstream activity for participants and spectators. This discipline involves a dog navigating through a timed obstacle course with precision and speed, showcasing the skills of the animal and the trainer.

Dog agility is not just a physical exercise but a mentally stimulating activity that requires teamwork and communication between the dog and its handler. The primary goal is to guide the dog through various obstacles, such as tunnels, weave poles, A-frames, and jumps, in a predetermined sequence. Armed with signals and cues, the handler directs the dog through the course, aiming for speed and accuracy. Success in agility training depends on the dog's instincts, the handler's skill, and the quality of training provided.

Agility training is an excellent form of dog exercise, promoting physical fitness, mental sharpness, and overall well-being. Additionally, it strengthens the bond between dog and owner, as they work together to conquer challenges. Dogs of all breeds and sizes can participate in agility training, and it provides an outlet for their instincts, such as running, jumping, and problem-solving. The mental stimulation from navigating through a course enhances a dog's cognitive abilities and can help address behavioral issues.

Jumps are a basic component of agility courses designed to test a dog's ability to precisely clear obstacles. Common types of jumps include the bar jump, tire jump, and the hoop jump. Jumps are strategically placed throughout the course, requiring the dog to adjust its speed and height based on the specific jump type.

As one may surmise from the name, in a hoop jump, a dog jumps through a hoop. Teaching a dog to jump through hoops involves a systematic approach. Typically, a dog is trained to walk through a hoop to get to a treat on the other side. Gradually, the hoop is raised off the ground, and praise may substitute for a treat in reinforcing the target behavior.

During training, a dog might not clear the hoop and contact the bottom of the suspended hoop, which could injure the animal, particularly if the contact results in the dog tumbling to the ground at the speed required to clear the jump otherwise. The American Kennel Club's highest jump height division, for dogs with a height of 22 inches or more at the withers, is currently 24 inches, so an uncontrolled fall could reasonably be expected to elicit at least a pained yelp, if not worse.

Accordingly, some dog trainers have adopted a breakaway hoop design. In one design, the hoop is formed by two semi-circles held together at the top by a strap and at the bottom by a magnet. To use, the hoop is suspended in a frame by three points. The top strap is suspended from a crossbar by one strap, and each side of the hoop is suspended by a strap to a vertical bar. When a dog contacts the bottom of the hoop with sufficient force, the semi-circles disengage from each other at the bottom, reducing the occurrence of injury.

Such designs require a user to carefully adjust the tension of the left and right-side connecting straps to hold the hoop together with the appropriate resilience. This design also tends to close immediately after opening because gravity forces the hoop to close around the single apical pivot point.

What is needed is a breakaway agility hoop that separates quickly and resists closing to reduce contact with the animal. Preferably, such an agility hoop would also have features that simplify setup. Other features and advantages will be made apparent from the present specification. The teachings disclosed extend to those embodiments that fall within the scope of the claims, regardless of whether they accomplish one or more of the needs mentioned above.

SUMMARY OF THE INVENTION

The subject matter of this application addresses these needs.

This application discloses an agility hoop with two pivot points, one each on the left and right side of the hoop. At the nadir of the hoop, the left and right pivot portions are held together by a magnet having sufficient strength to resist accidental separation but which can still be easily separated when contacted by an animal jumping through the hoop. The top portion of the hoop is approximately a semi-circle, and each end of this semi-circle is connected to the pivoting portions via a hinge. The disclosed agility hoop requires minimal setup and is held by left and right vertical supports. As the apex of the hoop is continuous, no upper horizontal support is needed. When an animal contacts the lower portion of the agility hoop, the magnets separate at the nadir, and the pivot portions pivot laterally, allowing the animal to pass without further interaction with the hoop. To reset, a trainer moves the pivoting portions together to engage the magnet.

Other features and advantages of the present invention will be apparent from the following more detailed description of the preferred embodiment, taken in conjunction with the accompanying drawings, which illustrate, by way of example, the principles of the invention.

BRIEF DESCRIPTION OF DRAWINGS

The same reference numbers will be used throughout the drawings to represent the same parts wherever possible.

DETAILED DESCRIPTION OF THE INVENTION

Figure 1:
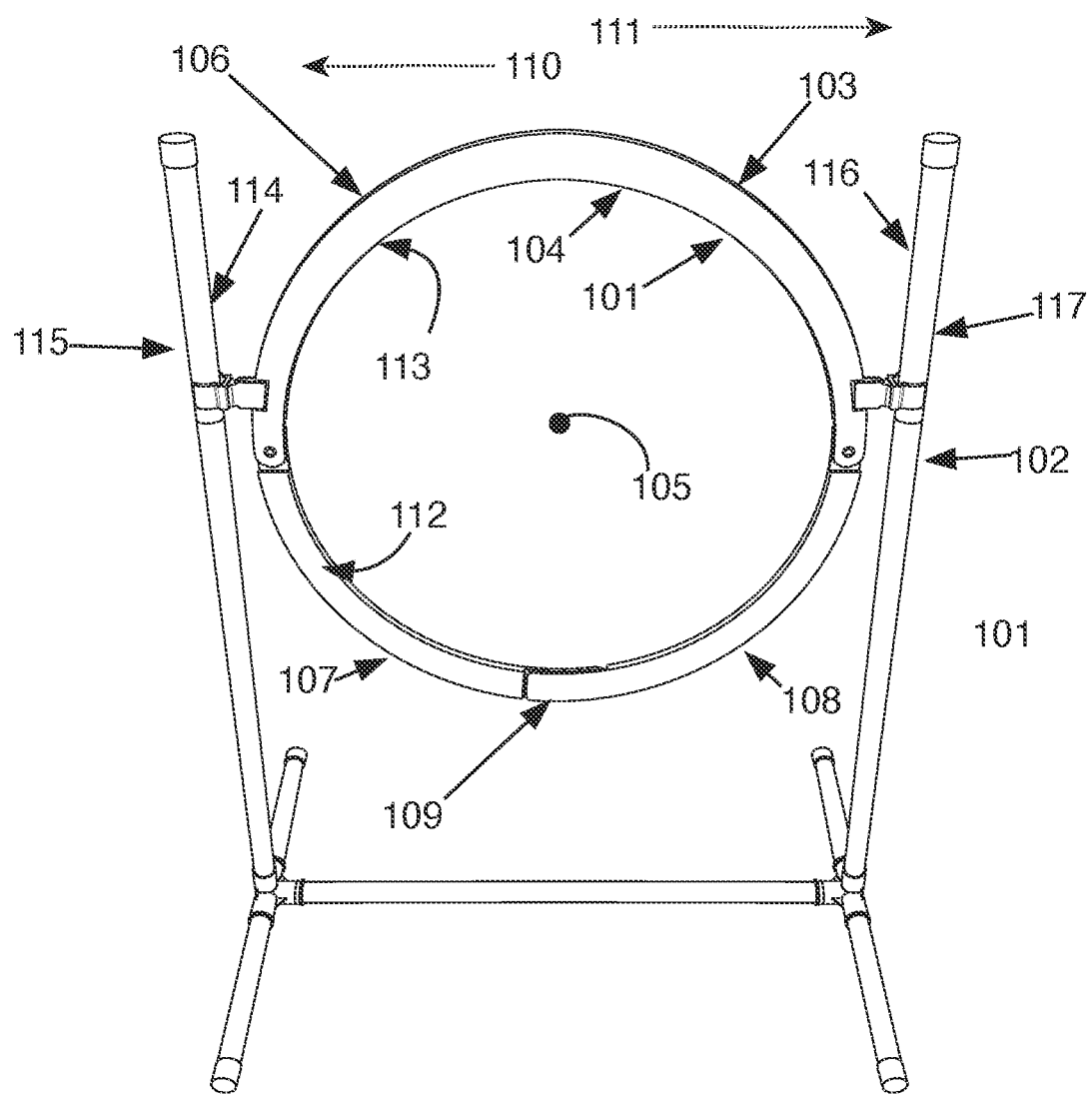
FIG. 1 illustrates a breakaway dog agility hoop in a closed conformation.

While the exemplary embodiments illustrated in the figures and described herein are presently preferred, it should be understood that these embodiments are only examples. Accordingly, the present application is not limited to a particular embodiment but extends to various modifications that fall within the scope of the appended claims. The order or sequence of any processes or method steps may be varied or re-sequenced according to alternative embodiments.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes, and omissions may be made in the design, operating conditions, and arrangement of the exemplary embodiments without departing from the scope of the present application.

Uses of the verbs 'include' and 'have' should be understood to mean 'comprise,' i.e., the terms are inclusive and open-ended and do not exclude additional elements or steps. The hoop is described as 'annular,' which encompasses all generally annular structures, e.g., an annulus, an oval, and a ring torus.

A breakaway dog agility hoop obstacle comprises a breakaway hoop (101) and a frame (102).

A breakaway hoop is an annular structure comprising an outer diameter (103), an inner diameter (104), a center (105), a top portion (106), a first bottom portion (107), a second bottom portion (108), a nadir (109), a first side (110), a second side (111), a first face (112), a second face (113), and a plane. The first and second faces are approximately parallel to each other and to the plane of the breakaway hoop.

Figure 2:
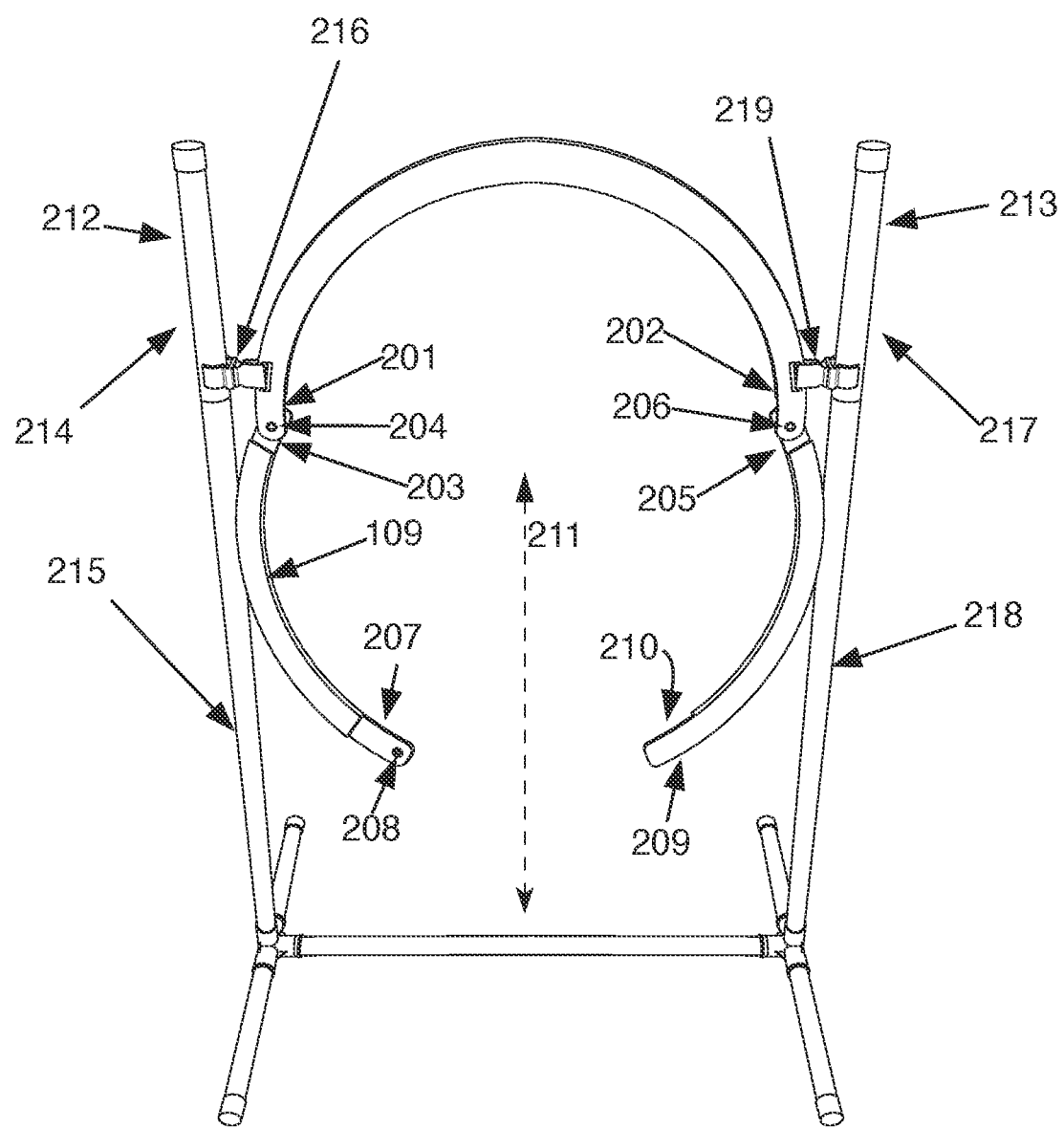
FIG. 2 illustrates a breakaway dog agility hoop in an open conformation.
Figure 3:
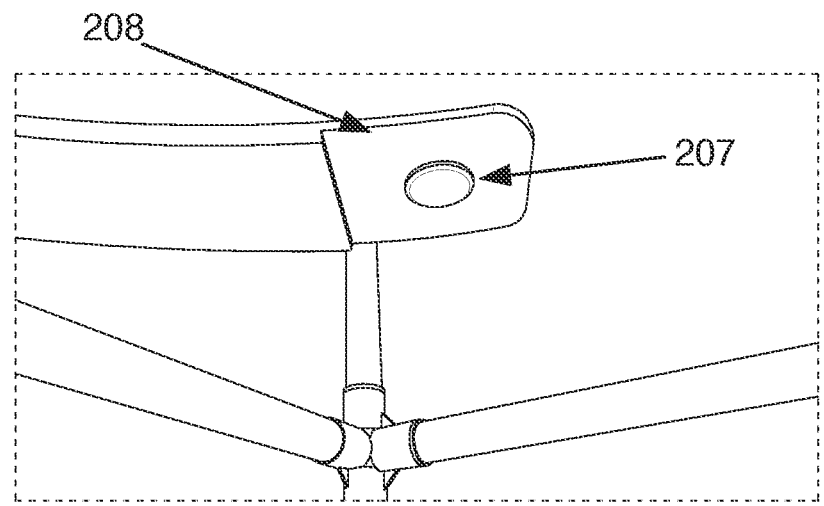
FIG. 3 is an illustration of a clasp end of a bottom portion of a breakaway dog agility hoop.
Figure 4:
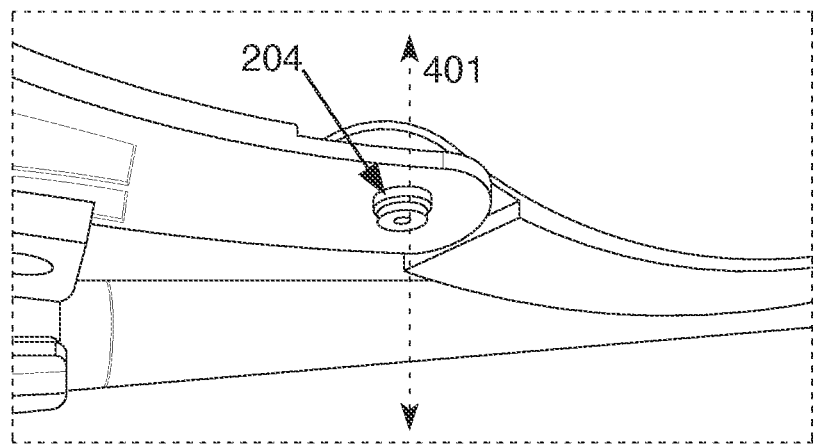
FIG. 4 illustrates a hinge connecting the top portion of the hoop to a bottom portion.
Figure 5:
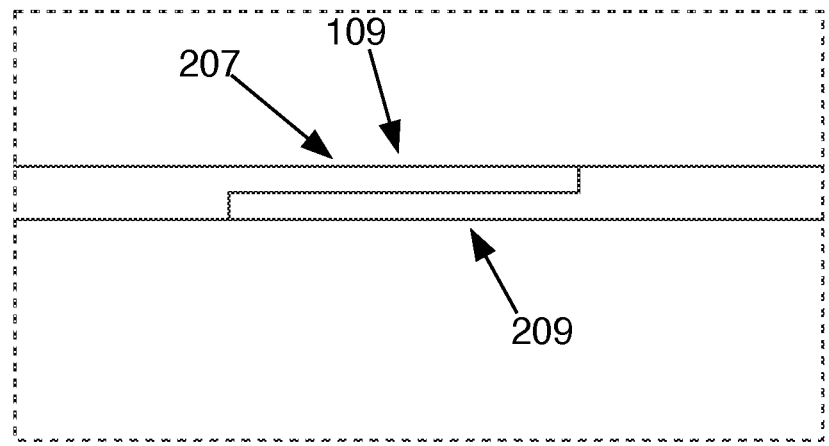
FIG. 5 illustrates an embodiment of the clasp holding the two bottom portions together in the closed conformation.
Figure 6:
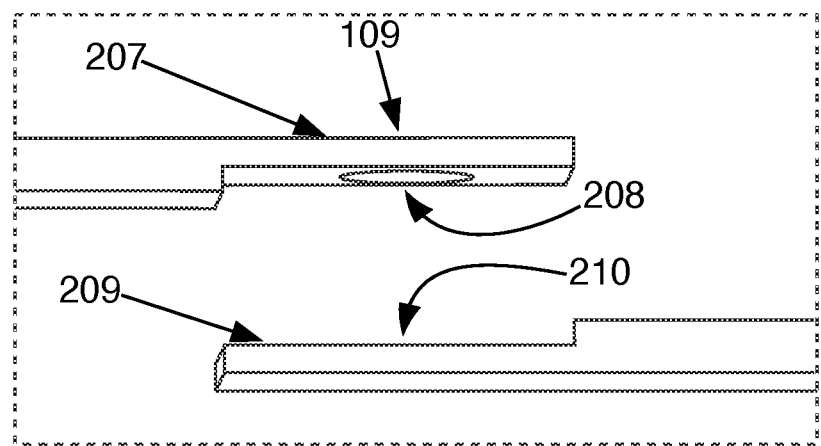
FIG. 6 illustrates the uncoupled clasp of FIG. 5.
Figure 7:
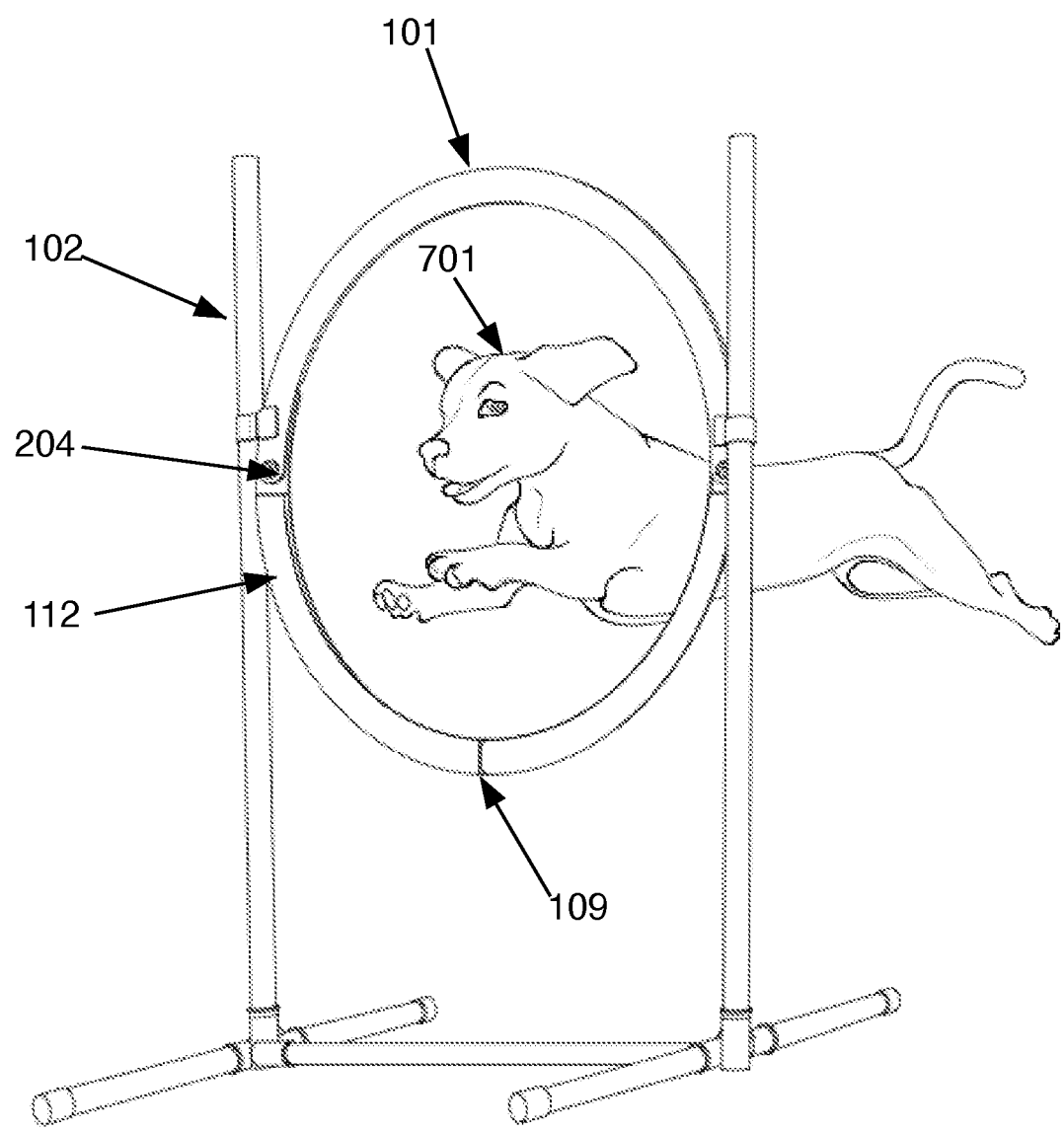
FIG. 7 is an illustration of a dog jumping through the breakaway dog agility hoop.

The breakaway hoop has an open conformation (FIG. 1), a closed conformation (FIG. 2), and a nigh-infinite number of intermediate conformations.

The top portion has a first hinge end (201) and a second hinge end (202). The first bottom portion has a hinge end (203) connected by a hinge assembly (204) to the first hinge end (201) of the top portion. The second bottom portion has a hinge end (205) connected by a hinge assembly (206) to the second hinge end (202) of the top portion. Each said hinge assembly comprises a hinge axis (e.g., 301) largely perpendicular to the plane of the hoop.

The first bottom portion further has a clasp end (207) comprising a first member (208) of a two-member fastening system (501). The second bottom portion further comprises a clasp end (209) having a second member (210) of the two-member fastening system (501). When reversibly connected, the two-member fastening system is located at approximately the nadir (109) of the hoop.

In a most highly preferred embodiment, each member of the two-member fastening system comprises a magnet adapted to attract the magnet of the other member. In another highly preferred embodiment, one member of the two-member fastening system includes a magnet, and the other member comprises a ferromagnetic material. In either of these two highly preferred embodiments, when the two bottom portions are rotated along their respective hinge axes toward each other, the two-member fastening system engages at the nadir of the hoop and holds the hoop in the closed conformation.

In all useful embodiments, the two-member fastening system can be uncoupled by a downward force (211) parallel to the plane of the hoop and acting on the nadir of the inner diameter of the hoop (109). In the most common use of the breakaway hoop, this force would be generated by a dog (701) leaping through the hoop and brushing against the nadir. Not all such brushes need to uncouple the bottom portions; some light brushes are common and expected. Accordingly, the force holding the two-member fastening system together must resist some level of force yet readily yield to some more significant amount of force. Through repeated testing, requiring a downward force of between 1 and 2 pounds, or approximately 1.5 pounds (6.67 N) to separate the two-member fastening system is suitable for the intended use.

The frame comprises a first vertical support (212) and a second vertical support (213). Said first vertical support includes a top portion (214), a bottom portion (215), an inner side (114) comprising a hoop connector (216), and an outer side (115). The second vertical support also has a top portion (217), a bottom portion (218), an inner side (116) comprising a hoop connector (219), and an outer side (217). Most preferred embodiments include one or more-foot structures (e.g., 702) to which one or both vertical supports are connected and hold the vertical supports upright.

When using the breakaway dog agility hoop obstacle, one would place the two vertical supports where appropriate and attach them to the foot structures or similar anchoring structures such that the vertical supports are upright and the inner side of each vertical support faces the other. The left side of the hoop is connected to the first vertical support via the hoop connector of the inner side of the support. The right side of the hoop is connected to the second vertical support via the hoop connector of the inner side of that support. The first bottom portion and the second bottom portion are rotated about their respective hinge axes to bring the two members of the two-member fastening system together and engage said fastening system.

When used as a dog agility obstacle, a dog is presented with the agility hoop and trained by the dog's handlers to jump through it. Most commonly, the dog would run toward the second face of the hoop in the closed conformation and leap through the hoop, passing over the nadir of the hoop and the bottom portions. However, if the dog jumps and contacts the bottom portions, the hoop separates at the nadir, and the paired bottom portions rotate away from the nadir, creating a space through which the dog can pass.

The invention claimed is:

1. A breakaway dog agility hoop obstacle, comprising a frame and an annular hoop,
    said frame comprises a first vertical support and a second vertical support,
        each said vertical support comprises a top, a bottom terminating in a foot, and a longitudinal axis,
        the longitudinal axis of the first vertical support is parallel to the longitudinal axis of the second vertical support,
    said hoop generally defines a plane and comprises a front face and a rear face, said hoop further comprises a top portion, a first bottom portion, and a second bottom portion;

said top portion being an arc of approximately 180° and having a first terminus and a second terminus;

said first vertical support being coupled to the top portion of the hoop near the first terminus of the top portion of the hoop, and said first bottom portion of the hoop being coupled to the top portion of the hoop near the second terminus of the top portion of the hoop;

said first bottom portion of the hoop being an arc of approximately 90° and having a first terminus and a second terminus, the first terminus of the first bottom portion being hingedly connected to the first terminus of the top portion of the hoop, such that the first bottom portion of the hoop may pivot in relation to the top portion of the hoop while remaining approximately within the plane of the hoop, and said second bottom portion of the hoop being an arc of approximately 90° and having a first terminus and a second terminus, the first terminus of the second bottom portion being hingedly connected to the second terminus of the top portion of the hoop, such that the second bottom portion of the hoop may pivot in relation to the top portion of the hoop while remaining approximately within the plane of the hoop, and the second terminus of the first bottom portion of the hoop comprises a first member of a two-member magnetic clasp, and the second terminus of the second bottom portion of the hoop comprises a second member of the two-member magnetic clasp, wherein:
 the hoop is configured for a dog to jump therethrough; and
 if the dog contacts the first and the second bottom portions while jumping through the hoop, then the downward force from the dog causes the first bottom portion to separate from the second bottom portion, and the first and the second bottom portions rotate away from each other to create a space through which the dog can pass.

\* \* \* \* \*